United States Patent
Yao

(10) Patent No.: US 11,155,115 B2
(45) Date of Patent: Oct. 26, 2021

(54) LETTERING FILM

(71) Applicant: CHANCE LINE INDUSTRIAL CO., LTD., Siansi Township (TW)

(72) Inventor: Ming-Hsien Yao, Siansi Township (TW)

(73) Assignee: CHANCE LINE INDUSTRIAL CO., LTD., Siansi Township (TW)

( * ) Notice: Subject to any disclaimer, the term of this patent is extended or adjusted under 35 U.S.C. 154(b) by 41 days.

(21) Appl. No.: 16/751,010

(22) Filed: Jan. 23, 2020

(65) Prior Publication Data

US 2020/0269631 A1 Aug. 27, 2020

(30) Foreign Application Priority Data

Feb. 23, 2019 (TW) ................. 108106176

(51) Int. Cl.
| | | |
|---|---|---|
| *B44C 1/16* | (2006.01) | |
| *B32B 3/26* | (2006.01) | |
| *B44C 1/165* | (2006.01) | |
| *G09F 3/10* | (2006.01) | |
| *G09F 3/02* | (2006.01) | |
| *C09J 7/40* | (2018.01) | |
| *B32B 3/02* | (2006.01) | |

(Continued)

(52) U.S. Cl.
CPC ............. *B44C 1/162* (2013.01); *B32B 3/02* (2013.01); *B32B 3/263* (2013.01); *B32B 7/06* (2013.01); *B32B 27/08* (2013.01); *B44C 1/165* (2013.01); *C09J 7/35* (2018.01); *G09F 3/10* (2013.01); *B32B 7/12* (2013.01); *B32B 2405/00* (2013.01); *B32B 2451/00* (2013.01); *B32B 2519/00* (2013.01); *C09J 7/40* (2018.01); *C09J 2203/358* (2020.08); *G09F 3/04* (2013.01); *G09F 2003/0257* (2013.01); *G09F 2003/0282* (2013.01); *Y10T 428/1486* (2015.01)

(58) Field of Classification Search
CPC ......... B44C 1/162; B44C 1/165; B32B 3/263; B32B 3/02; B32B 27/08; B32B 7/12; B32B 7/06; B32B 2405/00; B32B 2451/00; B32B 2519/00; G09F 3/10; G09F 3/04; G09F 2003/0257; G09F 2003/0282; Y10T 428/1486; C09J 7/40; C09J 7/35; C09J 2203/358
See application file for complete search history.

(56) References Cited

U.S. PATENT DOCUMENTS

| 5,310,589 A * | 5/1994 | Nagashima ............ B41M 5/035 428/200 |
| 2011/0303353 A1 * | 12/2011 | Dolsey .................... D06P 5/003 156/230 |

(Continued)

*Primary Examiner* — Patricia L. Nordmeyer
(74) *Attorney, Agent, or Firm* — Guice Patents PLLC

(57) ABSTRACT

A lettering film includes a lettering layer, a middle layer and a substrate layer. The lettering layer, the middle layer and the substrate layer are separably adhered to each other. The lettering layer has cutting stripes. The lettering film can be cut into characters and/or figures. The cutting marks of the characters and/or figures cut the lettering layer and the middle layer without cutting off the substrate layer. The lettering layer of the lettering film is adhered to an article and then the substrate layer and the middle layer are peeled off, whereby the lettering layer is adhered to the article and the cut characters and/or figures are adhered to the surface of the article.

11 Claims, 10 Drawing Sheets

(51) Int. Cl.
*B32B 27/08* (2006.01)
*B32B 7/06* (2019.01)
*C09J 7/35* (2018.01)
*G09F 3/04* (2006.01)
*B32B 7/12* (2006.01)

(56) References Cited

U.S. PATENT DOCUMENTS

2018/0114469 A1 4/2018 Yao
2018/0320030 A1 11/2018 Yao

* cited by examiner

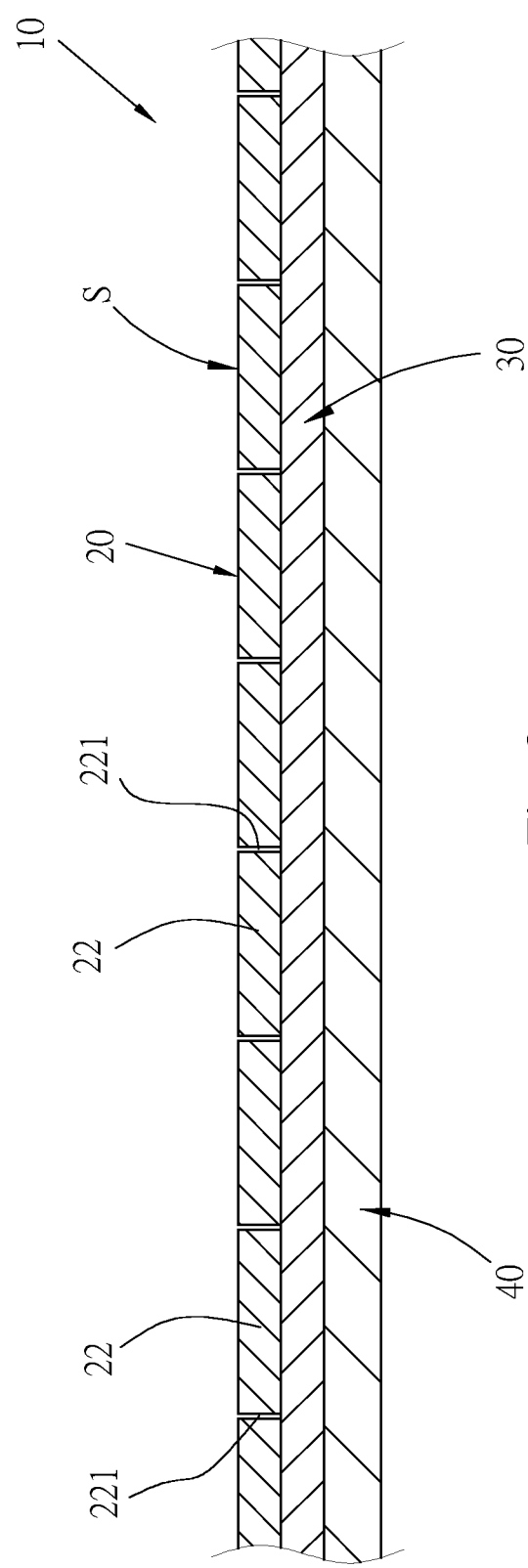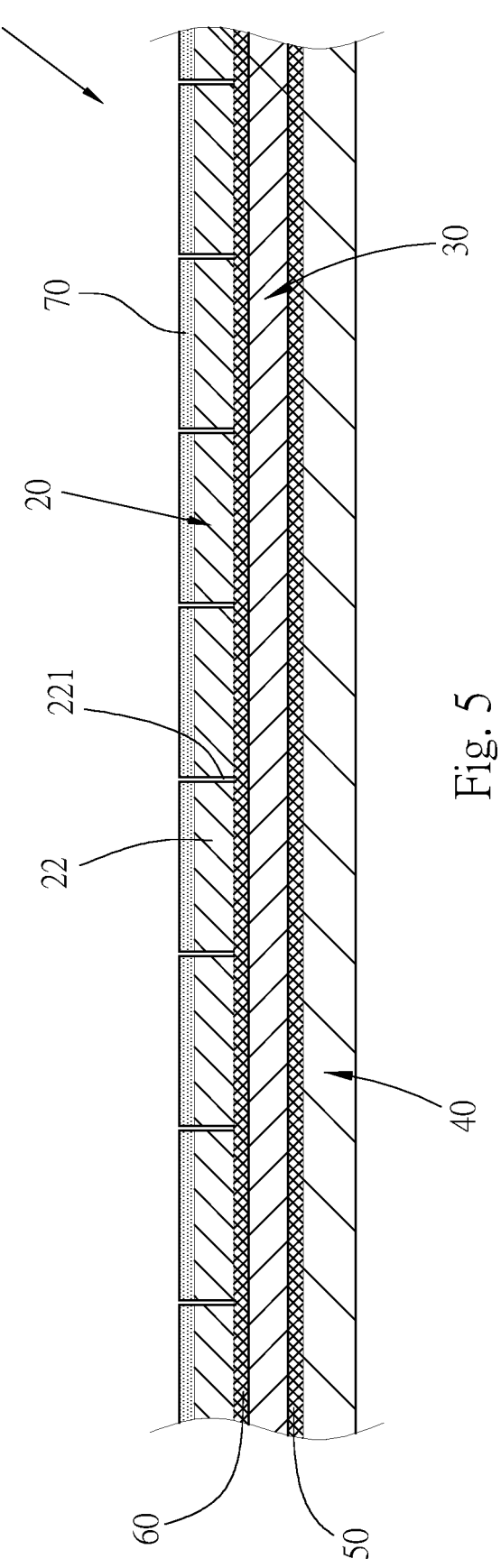

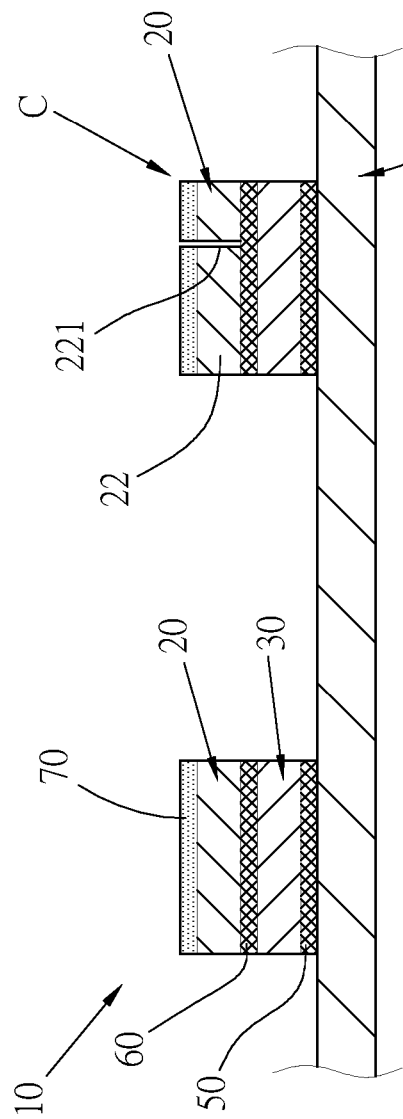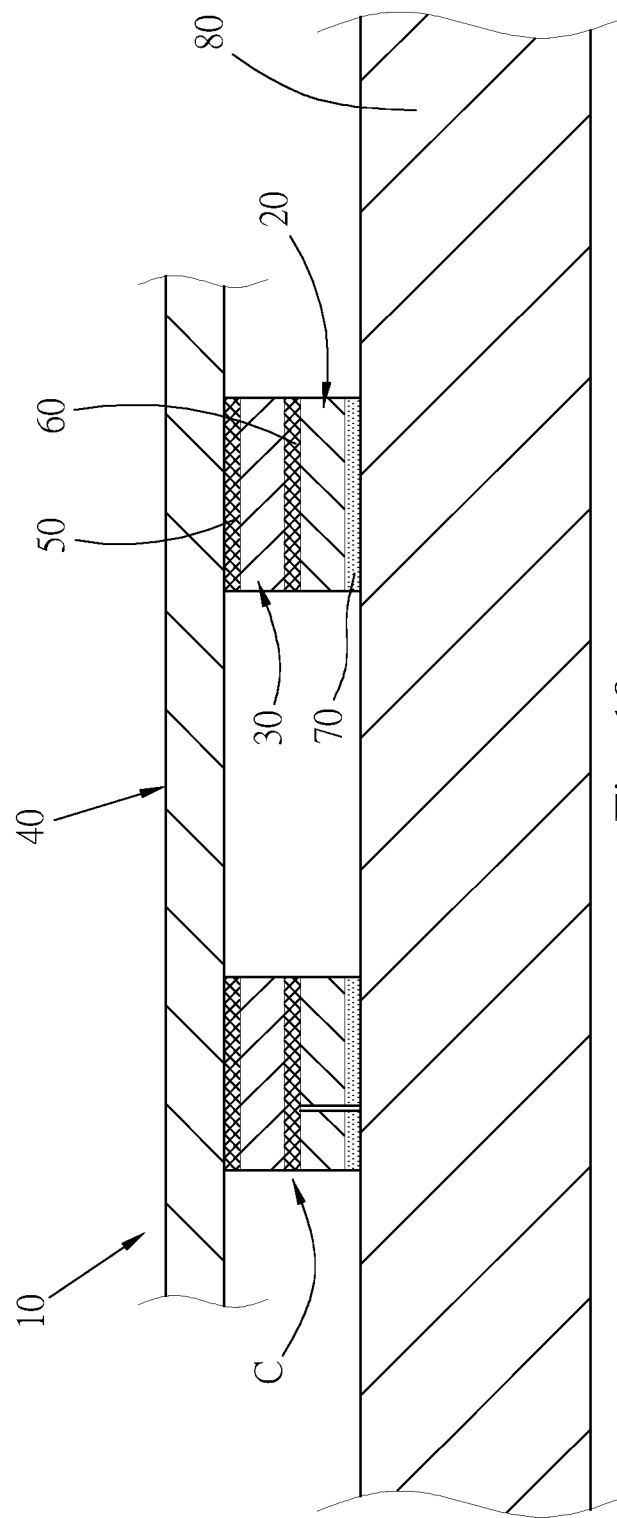

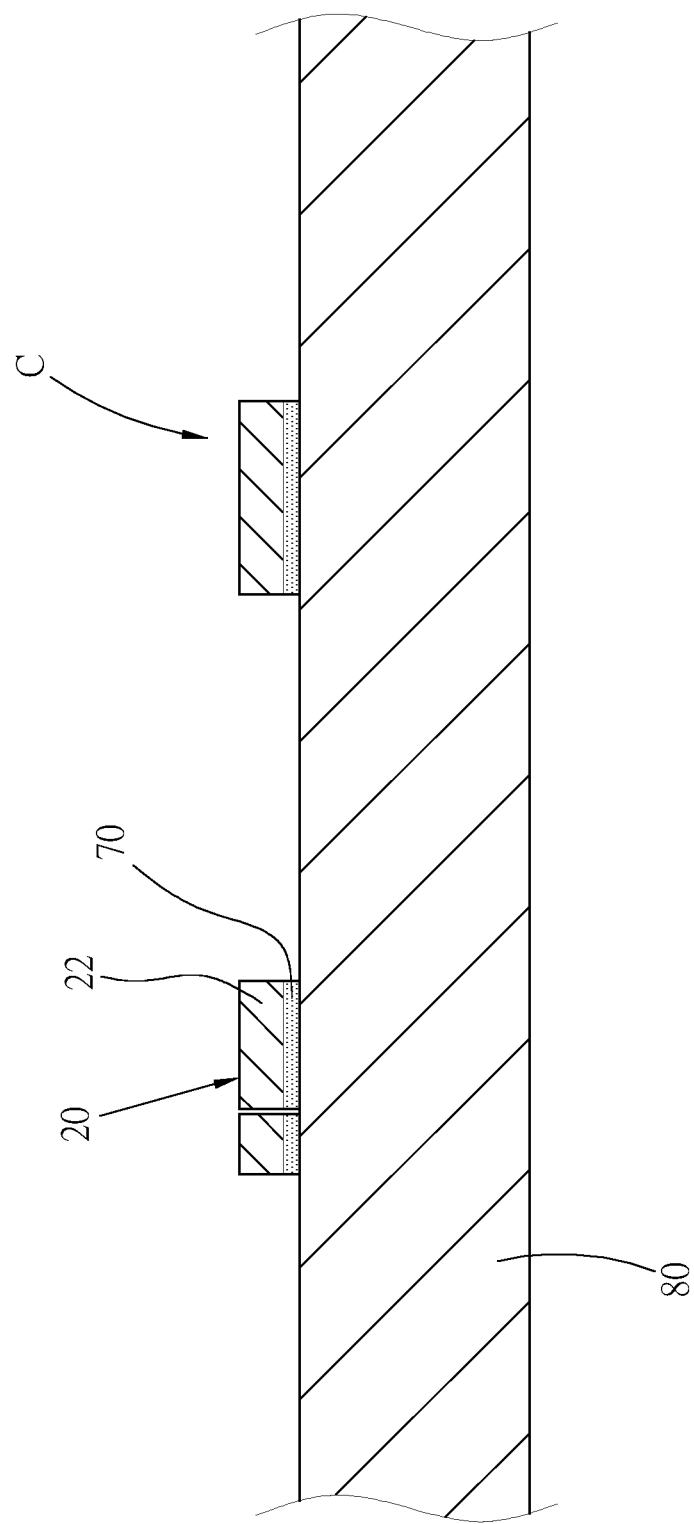

LETTERING FILM

BACKGROUND OF THE INVENTION

1. Field of the Invention

The present invention relates generally to a plastic film, and more particularly to a lettering film, which can be cut into figures and/or characters.

2. Description of the Related Art

A clothes with characters and/or figures thereon can enhance the visual attraction and have uniqueness. To achieve this object, conventionally the figures and/or characters are printed on the clothes to present the figures and/or characters. However, in the case of printing, it is necessary to manufacture halftone for the printing. The more the patterns of the printed characters and/or figures are, the more time the proofing will cost and the more the halftones it is necessary to manufacture. Therefore, the cost for manufacturing the halftones will be quite high. Moreover, the proofing speed is slow so that the changing speed of the figures and/or characters is also slow. This fails to meet the current trend of quick change.

The inventor's application Ser. No. 15/298,486 "cutting plotter film with anti-counterfeit effect" provides a lettering film, which can be cut into characters and/or figures by an enterprise or a consumer. The cut characters and/or figures can be adhered to a clothes. Therefore, the shortcomings existing in the conventional printing technique that the proofing and halftone manufacturing are time-consuming and costing can be eliminated. In addition, the patterns of the characters and/or figures can be quickly changed.

The inventor has an innovative design for the lettering film and has developed the present invention.

SUMMARY OF THE INVENTION

It is an object of the present invention to provide a lettering film different from the conventional lettering film. The surface of the lettering film is cut to form stripes, whereby the lettering film is gentler and has sophisticated stripes in appearance.

In use, the lettering film is cut into characters and/or figures, which have the cutting stripes.

The lettering film of the present invention includes:

a lettering layer, a middle layer and a substrate layer, the lettering layer, the middle layer and the substrate layer are adhered to each other; the middle layer is positioned between the lettering layer and the substrate layer; the adhesion force between the lettering layer, the middle layer and the substrate layer is such that the three layers are separably bonded with each other; and a surface of the lettering layer is cut with cutting marks to form cutting stripes.

Accordingly, the lettering film can be cut into characters and/or figures. The cutting marks of the characters and/or figures cut off the lettering layer and the middle layer without cutting off the substrate layer. After the cut waste materials are removed, the lettering layer of the lettering film is adhered to an article, then the substrate layer and the middle layer are peeled off, whereby the lettering layer is adhered to the article and the cut characters and/or figures are adhered to the surface of the article. The cut characters and/or figures have the cutting stripes on the surface.

Preferably, the adhesion force between the middle layer and the substrate layer is greater than the adhesion force between the lettering layer and the middle layer so that it is easy to remove the waste materials.

Preferably, the thickness of the substrate layer is larger than the thickness of the middle layer and the thickness of the lettering layer.

Preferably, the surface of the letter layer is cut with cutting marks to form multiple fine scales. The fine scales have the same shape to form regular cutting stripes on the lettering layer.

The lettering film of the present invention can be cut into various characters and/or figures. The figures and/or characters cut from the lettering film can be quickly and conveniently adhered to an article. The changing speed of the characters and figures of the lettering film is fast and it is unnecessary to manufacture the halftone. Therefore, the cost and time are saved.

The fine scales formed on the lettering layer will not affect the cutting operation of the characters and/or figures, the peeling of the cut waste materials of the lettering film and the adhesion operation of the lettering film. The characters and/or figures that adhered to an article have the stripes formed by the fine scales. The fine scales make the characters and/or figures gentler and more flexible so that the characters and figures can be more truly adhered to the surface of the article and bent or flexed along with the article (such as a fabric).

The present invention can be best understood through the following description and accompanying drawings, wherein:

BRIEF DESCRIPTION OF THE DRAWINGS

FIG. 2 is a general sectional view of the preferred embodiment of the lettering film of the present invention, showing the three major layer structures of the lettering film;

FIG. 5 is a complete sectional view of the preferred embodiment of the lettering film of the present invention;

FIG. 9 is a sectional view taken along line 9-9 of FIG. 8

FIG. 10 is a sectional view according to FIG. 9, showing that the lettering film is cut and the waste materials are removed and the lettering film is adhered to an article;

FIG. 11 is a sectional view showing that the lettering layer of the lettering film is adhered to the article.

DETAILED DESCRIPTION OF THE PREFERRED EMBODIMENTS

Figure 1:
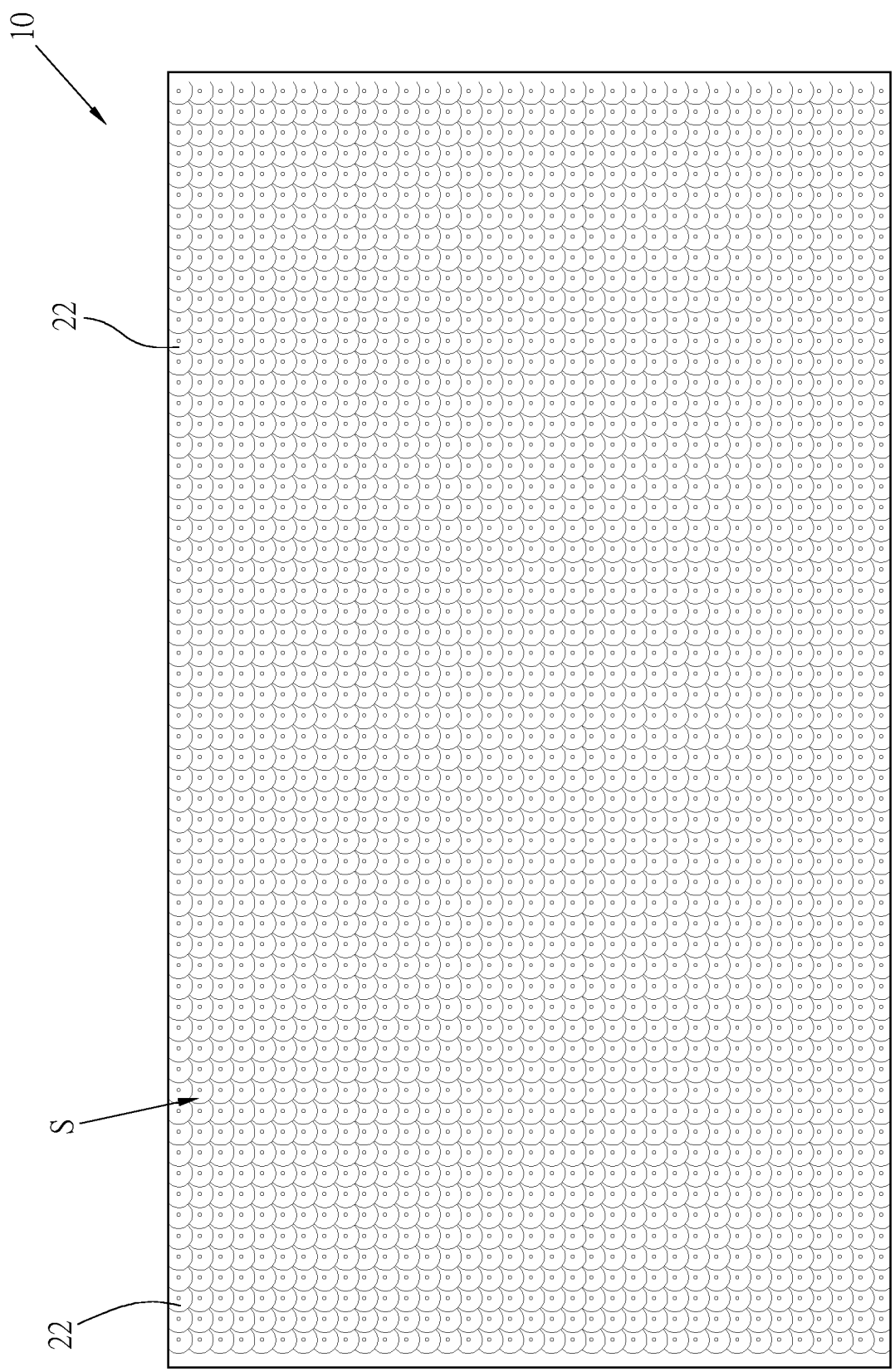
FIG. 1 is a front view of a preferred embodiment of the lettering film of the present invention, in which the cutting surface of the lettering film has been previously cut with regular stripes, wherein the lettering layer and the cutting surface are positioned on the top face of the lettering film in FIGS. 1 to 8.

Please refer to FIGS. 1 and 2. According to a preferred embodiment, the lettering film 10 of the present invention includes a lettering layer 20, a middle layer 30 and a substrate layer 40 adhered to each other. The middle layer 30 is positioned between the lettering layer 20 and the substrate layer 40. The adhesion force between the lettering layer 20, the middle layer 30 and the substrate layer 40 is such that the three layers 20, 30, 40 are separably bonded with each other. That is, the lettering layer 20 and the middle layer 30 are adhered to each other, but can be peeled off from each other. Also, the middle layer 30 and the substrate layer 40 are adhered to each other, but can be peeled off from each other.

The lettering layer 20 is formed as a surface of the lettering film 10 and is defined as a cutting surface S. The lettering layer 20 is cut with cutting marks 221 to form regular stripes. Accordingly, the cutting surface S has multiple fine scales 22 with the same shape. Please refer to FIG. 3. In this embodiment, the cutting surface S is regularly cut by means of laser cutting technique to form circular cutting marks 221 and the cutting marks 221 cut off the lettering layer 20. Accordingly, the cutting surface S is cut into multiple fine scales 22 in the form of fish scales. Each fine scale 22 can be peeled off. With the fine scale 22a in FIG. 3 taken as an example, the fine scale 22a is peeled off from the lettering film 10 to separate therefrom. The object of cutting the cutting surface S into multiple fine scales 22 is to make the lettering film 10 gentler and have better tactility as well as form fine stripes in appearance.

Figure 3:
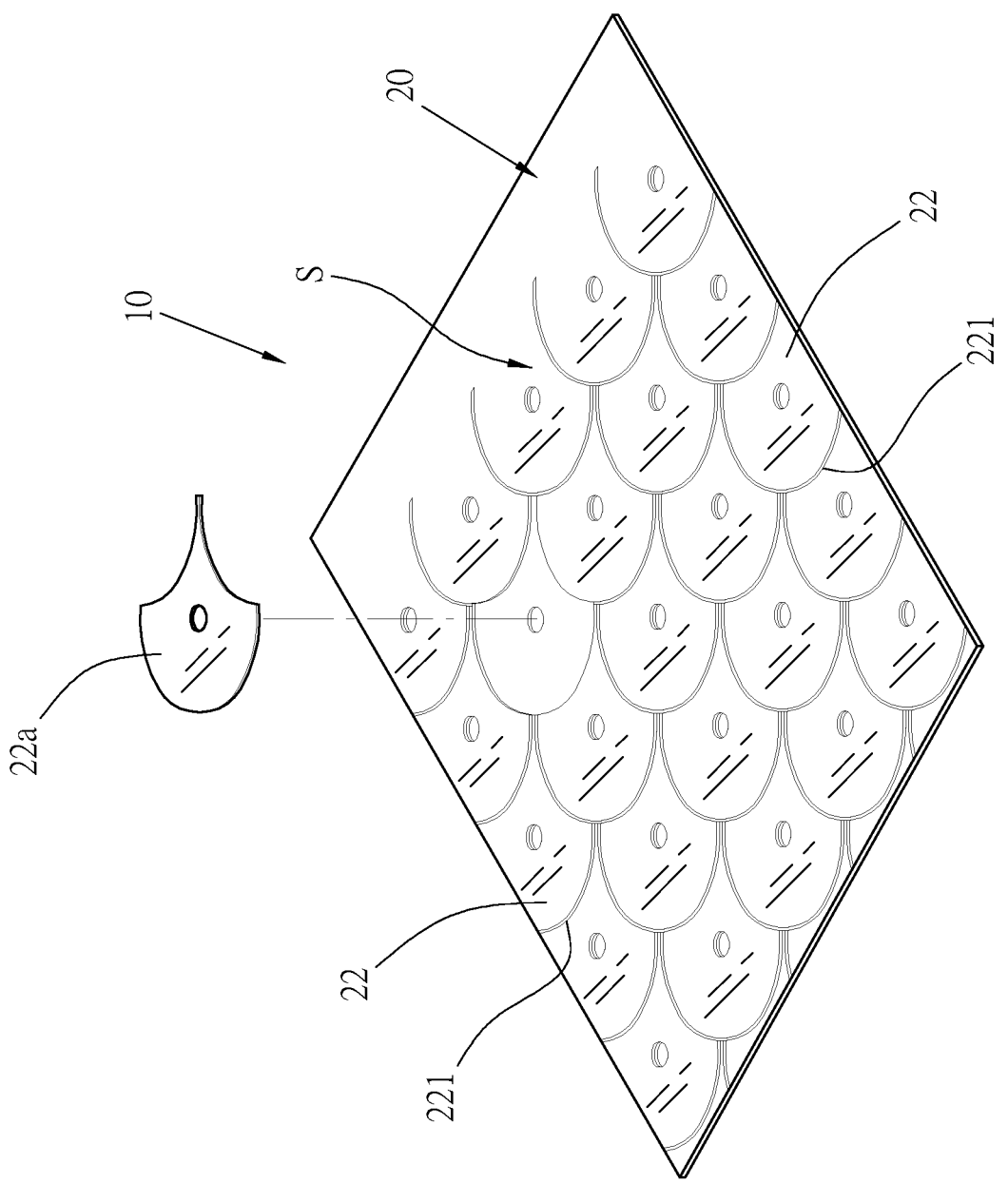
FIG. 3 is an enlarged view of a part of FIG. 1.
Figure 4:
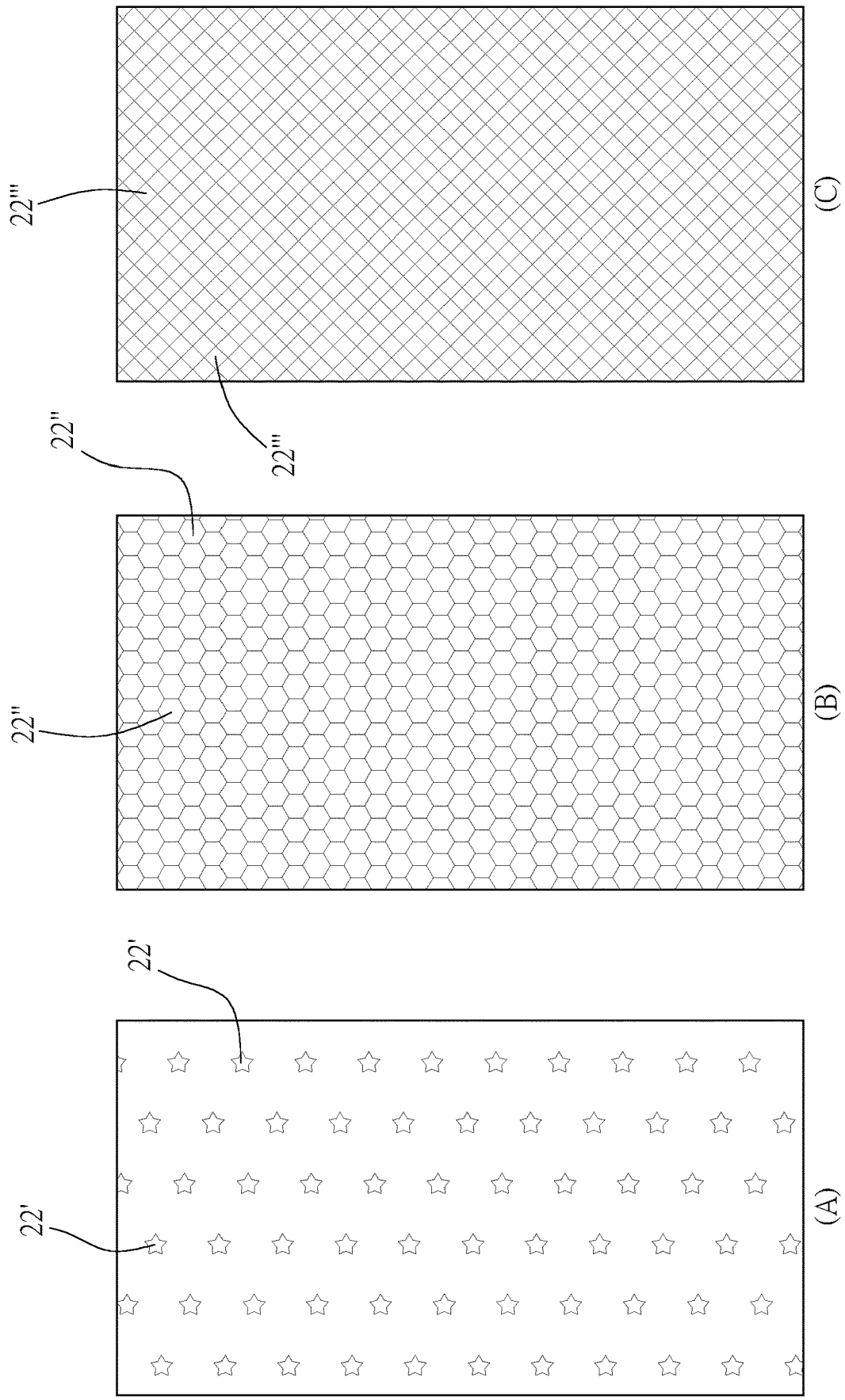
FIGS. 4A to 4C show three types of cutting stripes applicable to the cutting surface of the lettering film of the present invention.

The shape of the fine scales 22 on the cutting surface S of the lettering film 10 is not limited to the form of fish scale as shown in FIG. 3. For example, as shown in FIGS. 4A, 4B and 4C, the cutting surface S can be, but not limited to, cut into multiple star-shaped fine scales 22', hexagonal fine scales 22" or rectangular/rhombic fine scales 22'''. Each of the fine scales 22', 22", 22''' can be independently peeled off from the lettering film.

In the structure of the lettering film 10 with the multiple fine scales 22 provided by the present invention, which can be peeled off from the surface, the lettering film 10 can be further cut to form the desired characters and/or figures. In addition, when the cut waste material is removed from the lettering film 10 to keep the desired characters and/or figures, the fine scales 22 will not affect the removal of the cut waste material. Also, the fine scales 22 will not affect the adhesion operation of the cut characters and/or figures to an article.

In this embodiment, the material of the lettering layer 20 is polyurethane (PU). Alternatively, the material of the lettering layer 20 can be gold foil, polyethylene terephthalate (PET), polyvinyl chloride (PVC), thermoplastic polyurethane (TPU) and thermoplastic rubber material (TPR). The lettering layer 20 can be made with various colors.

In this embodiment, the middle layer 30 and the substrate layer 40 are selectively made of polyethylene terephthalate (PET) and are preferably transparent. In addition, the thickness of the substrate layer 40 is larger than the thickness of the middle layer 30. The middle layer 30 and the substrate layer 40 are heat-resistant and high-temperature-tolerant, for example, against 100~180° C. Moreover, the middle layer 30 preferably has a proper thickness such as not less than 50 μm so as to prevent the cutting marks 221 of the fine scales 22 from cutting off the middle layer 30.

Please refer to FIG. 5. To speak more specifically, the lettering film 10 further includes a first adhesive layer 50, a second adhesive layer 60 and a bonding layer. In this embodiment, the bonding layer is a hot melt adhesive layer 70. The middle layer 30 and the substrate layer 40 are adhered to each other via the first adhesive layer 50. The middle layer 30 and the lettering layer 20 are adhered to each other via the second adhesive layer 60. The adhesion force of the first adhesive layer 50 is greater than the adhesion force of the second adhesive layer 60. Therefore, the adhesion between the middle layer 30 and the substrate layer 40 is greater than the adhesion between the lettering layer 20 and the middle layer 30.

The hot melt adhesive layer 70 is disposed on the outer surface of the lettering layer 20. When the cutting marks 221 cut the fine scales 22, the cutting marks 221 also cut off the hot melt adhesive layer 70.

The lettering film 10 of the present invention can be for an enterprise to cut into characters and/or figures with a cutting apparatus such as laser cutting apparatus. Alternatively, a common consumer can cut the lettering film 10 into characters and/or figures. The cut characters and/or figures are then adhered to an article such as the surface of a fabric (clothes), whereby the surface of the article has the cut characters and/or figures.

Figure 6:
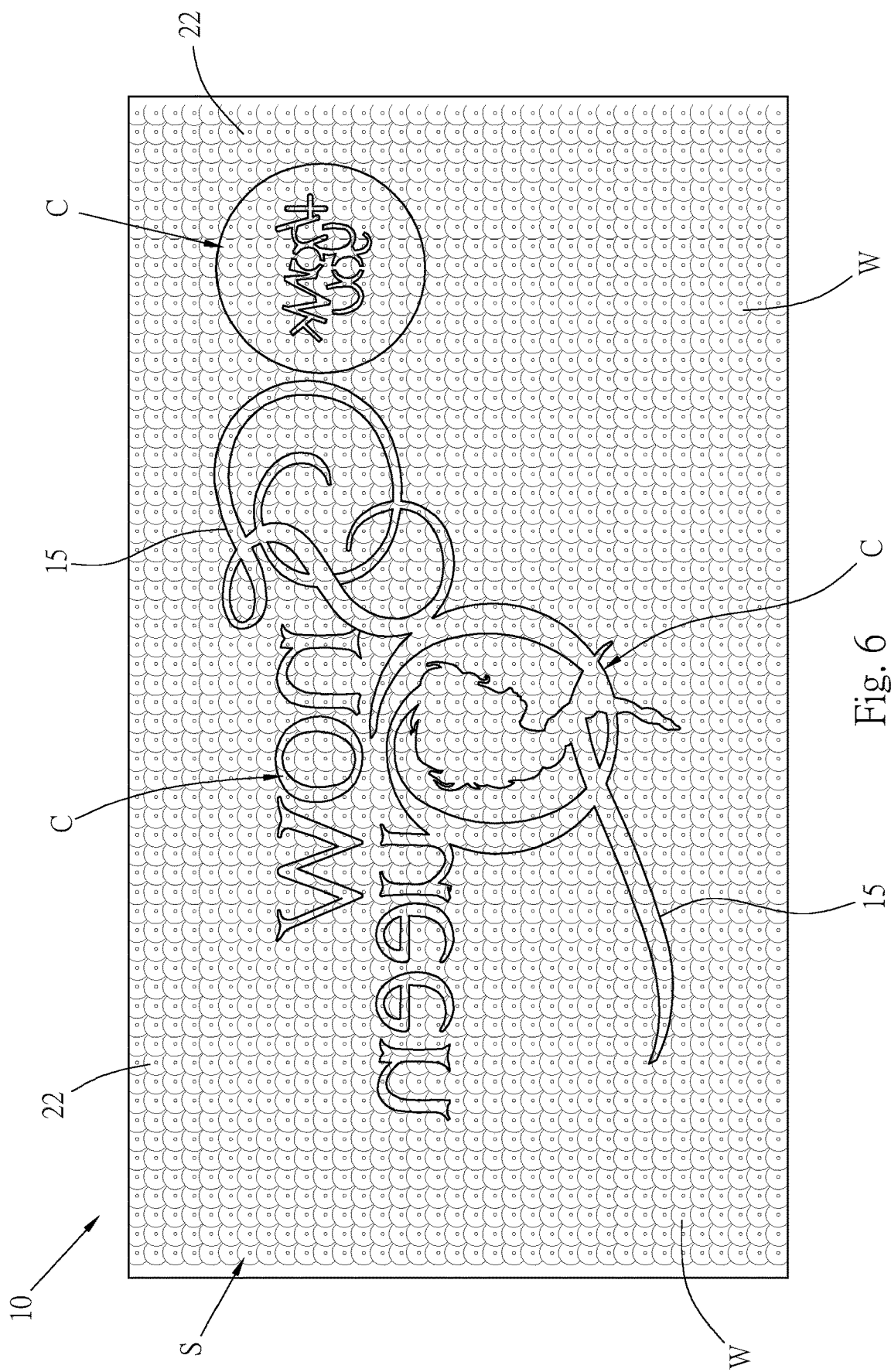
FIG. 6 is a view of the preferred embodiment of the lettering film of the present invention, showing the characters and figures are cut from the lettering film.
Figure 7:
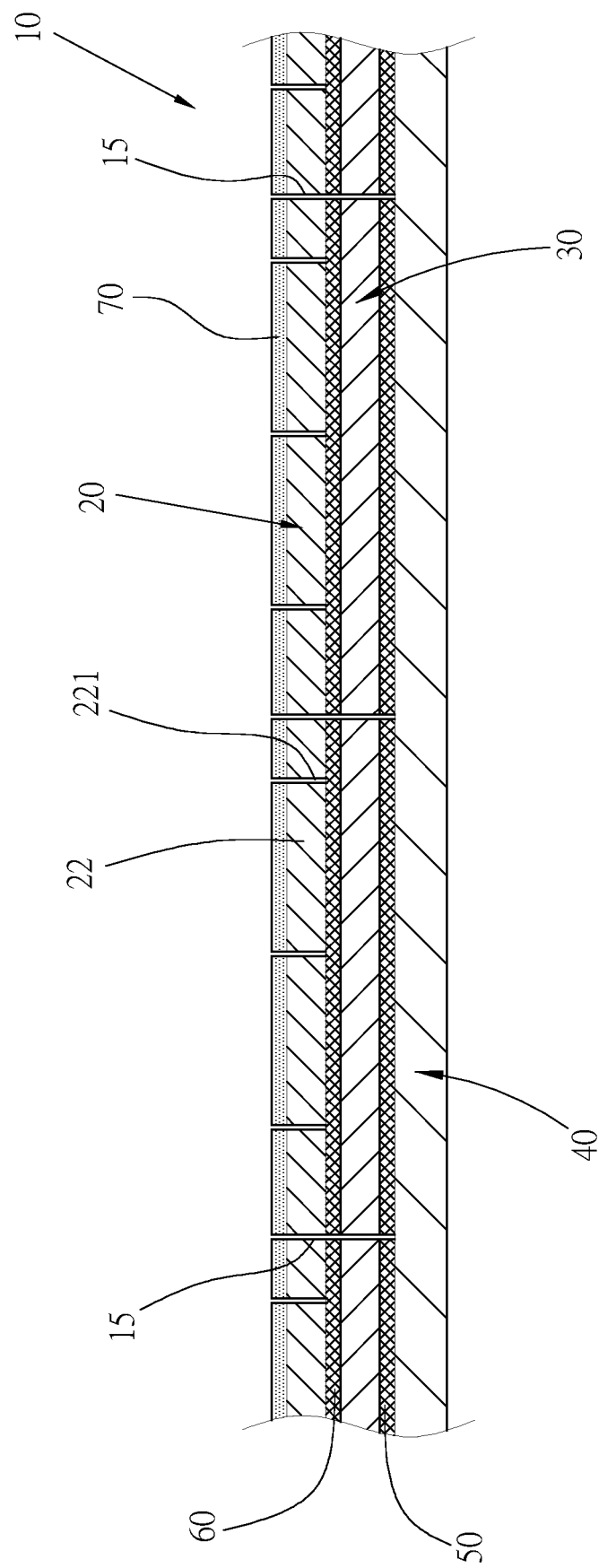
FIG. 7 is a sectional view of FIG. 6.

Please refer to FIGS. 6 and 7. In this embodiment, the characters and figures cut from the lettering film 10 is denoted with C, such as English words "Snow Queen", "thank you" and the figure of a cartoon character positioned in the English capital letter "Q". In the drawing, the characters and figures C are presented in a mirror image. The characters and figures C are formed by design cutting marks 15. The design cutting marks 15 cut off the lettering layer 20, the middle layer 30, the hot melt adhesive layer 70 and the second adhesive layer 60. Alternatively, the design cutting marks 15 can also cut the first adhesive layer 50 without cutting off the substrate layer 40. The parts other than the characters and figures C are the cut waste materials W. The thickness of the substrate layer 40 is thickest among the respective layers. That is, the thickness of the substrate layer 40 is larger than the thickness of the lettering layer 20 and the thickness of the middle layer 30 so that the substrate layer 40 is prevented from being cut off.

Figure 8:
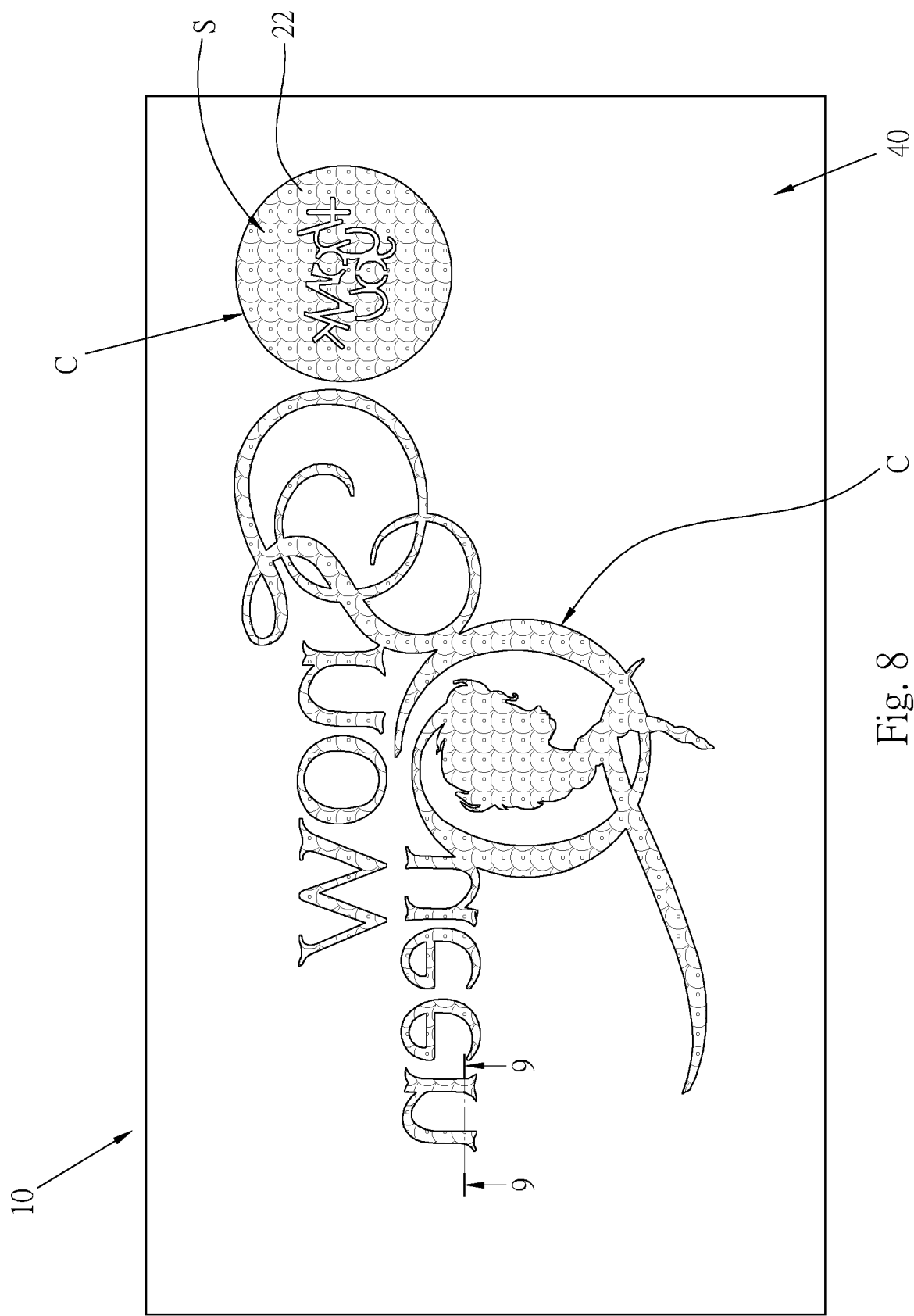
FIG. 8 shows that the unneeded parts have been removed from the lettering film of FIG. 6 and only the characters and figures cut and formed from the lettering film are left.

After the characters and figures C are cut, the cut waste materials W are peeled off. As shown in FIGS. 8 and 9, the cut waste materials W have been removed and only the desired characters and figures C are left, wherein the English words "Snow Queen" and the figure of the cartoon character are presented by solid lines, while the English words "thank you" are presented in hollow pattern. As shown in FIG. 9, after the cut waste materials W are removed, the remaining characters and figures C still have the lettering layer 20, the middle layer 30, the hot melt adhesive layer 70 and the first and second adhesive layers 50, 60.

Then, the lettering film 10 of FIG. 8 is placed on the article 80 to be adhered. The hot melt adhesive layer 70 is in contact with the surface of the article 80. Thereafter, a heating device such as an iron or an ironing machine is used to heat the lettering layer 20, whereby the hot melt adhesive layer 70 is adhered to the article 80. It should be noted that the bonding layer is not limited to the hot melt adhesive. Alternatively, the bonding layer can be selectively another adhesive material, the other adhesive material can be adhered to the surface of the article 80 in a manner suitable for the other adhesive material.

Then the final peeling operation is performed. The substrate layer 40 and the middle layer 30 are removed and only the lettering layer 20 keeps adhering to the article 80. The adhesion force of the first adhesive layer 50 is greater than the adhesion force of the second adhesive layer 60 so that the adhesion between the middle layer 30 and the substrate layer 40 is stronger than the adhesion between the middle layer 30 and the lettering layer 20. Therefore, when peeling off the substrate layer 40, the middle layer 30 is peeled off along with the substrate layer to separate from the lettering layer 20. Therefore, when peeling off the substrate layer 40, the middle layer 30 is removed along with the substrate layer and only the lettering layer 20 is left to keep adhered to the surface of the article 80. Therefore, it is easy to separate the middle layer 30 from the lettering layer 20.

Figure 12:
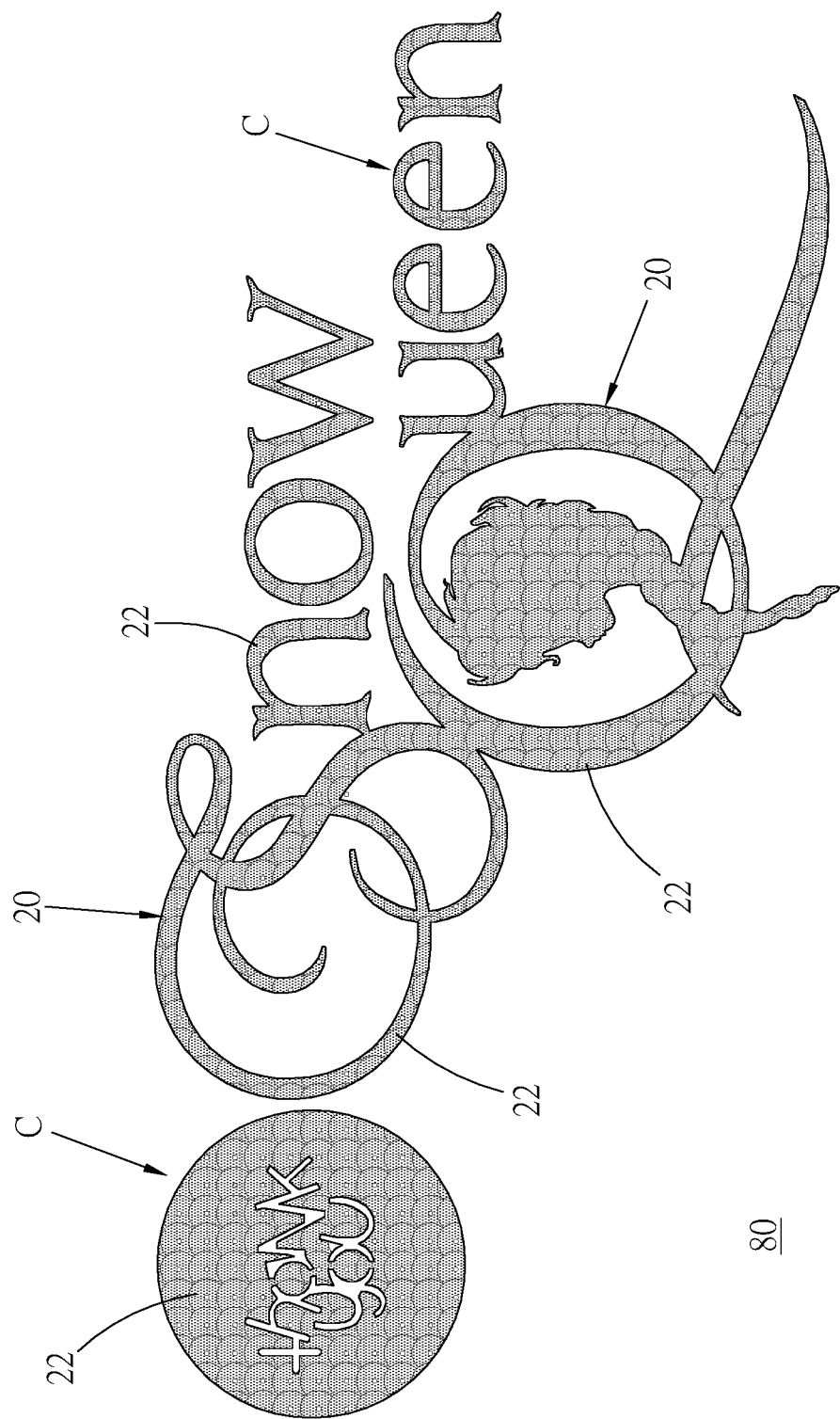
FIG. 12 is a view of a final product, showing that the characters and figures cut from the lettering film are adhered to the surface of the article.

FIG. 12 shows a final product of the lettering film in use in which the characters and figures C cut from the lettering film 10 are adhered to the surface of the article 80, after adhered, the characters and figures C are presented on the article in right image (non-mirror image).

The lettering film 10 of the present invention can be cut into various characters and figures C to conveniently adhere the characters and figures C to an article. The characters and figures C can be cut according to the desired patterns. The figures and/or characters can be quickly changed without making any plate. The adhered characters and figures C have complete or incomplete fine scales 22. The fine scales 22 previously formed on the lettering layer 20 will not affect the cutting operation of the characters and figures C, the peeling of the cut waste materials W and the adhesion operation of the lettering film. According to the design of the present invention, the cut waste materials can be conveniently removed to quickly and conveniently adhere the lettering layer to the surface of the article.

The cutting stripes formed on the cutting surface S of the lettering layer 20 form the stripes of the characters and figures C. The cutting stripes make the characters and figures C gentler and more flexible so that the characters and figures C can be more truly adhered to the surface of the article and bent or flexed along with the article (such as a fabric). The cutting marks 221 of the cutting surface S are not limited to cut off the lettering layer.

The above embodiments are only used to illustrate the present invention, not intended to limit the scope thereof. Many modifications of the above embodiments can be made without departing from the spirit of the present invention.

What is claimed is:

1. A lettering film comprising:
   a lettering layer;
   a middle layer; and
   a substrate layer; the lettering layer, the middle layer and the substrate layer being separably adhered to each other, the middle layer being positioned between the lettering layer and the substrate layer, an adhesion force between the lettering layer, the middle layer and the substrate layer being such that the three layers are separably bonded with each other; and
   a surface of the lettering layer being cut with cutting marks to form regular cutting stripes.

2. The lettering film as claimed in claim 1, wherein the lettering layer and the middle layer are adhered to each other by one adhesion force and the middle layer and the substrate layer are adhered to each other by another adhesion force, the another adhesion force between the middle layer and the substrate layer being greater than the one adhesion force between the lettering layer and the middle layer.

3. The lettering film as claimed in claim 1, further comprising a first adhesive layer and a second adhesive layer; the middle layer and the substrate layer being adhered to each other via the first adhesive layer; the middle layer and the lettering layer being adhered to each other via the second adhesive layer.

4. The lettering film as claimed in claim 3, wherein the adhesion force of the first adhesive layer is greater than the adhesion force of the second adhesive layer.

5. The lettering film as claimed in claim 3, wherein the lettering film is cut to form characters and/or figures by design cutting marks, the design cutting marks of the characters and/or figures cutting off the lettering layer, the middle layer and the second adhesive layer.

6. The lettering film as claimed in claim 5, wherein the cutting marks of the characters and/or figures also cut off the first adhesive layer.

7. The lettering film as claimed in claim 1, wherein the lettering film is cut to form characters and/or figures by design cutting marks, the design cutting marks of the characters and/or figures cutting off the lettering layer and the middle layer.

8. The lettering film as claimed in claim 7, further comprising a bonding layer disposed on an outer surface of the lettering layer.

9. The lettering film as claimed in claim 1, further comprising a bonding layer disposed on an outer surface of the lettering layer.

10. The lettering film as claimed in claim 9, wherein the cutting marks of the cutting stripes cut off the bonding layer and the letter layer.

11. The lettering film as claimed in claim 1, wherein the lettering layer is cut to form multiple fine scales as the cutting stripes, the cutting marks of the fine scales cutting off the letter layer.

* * * * *